United States Patent Office 2,724,886
Patented Nov. 29, 1955

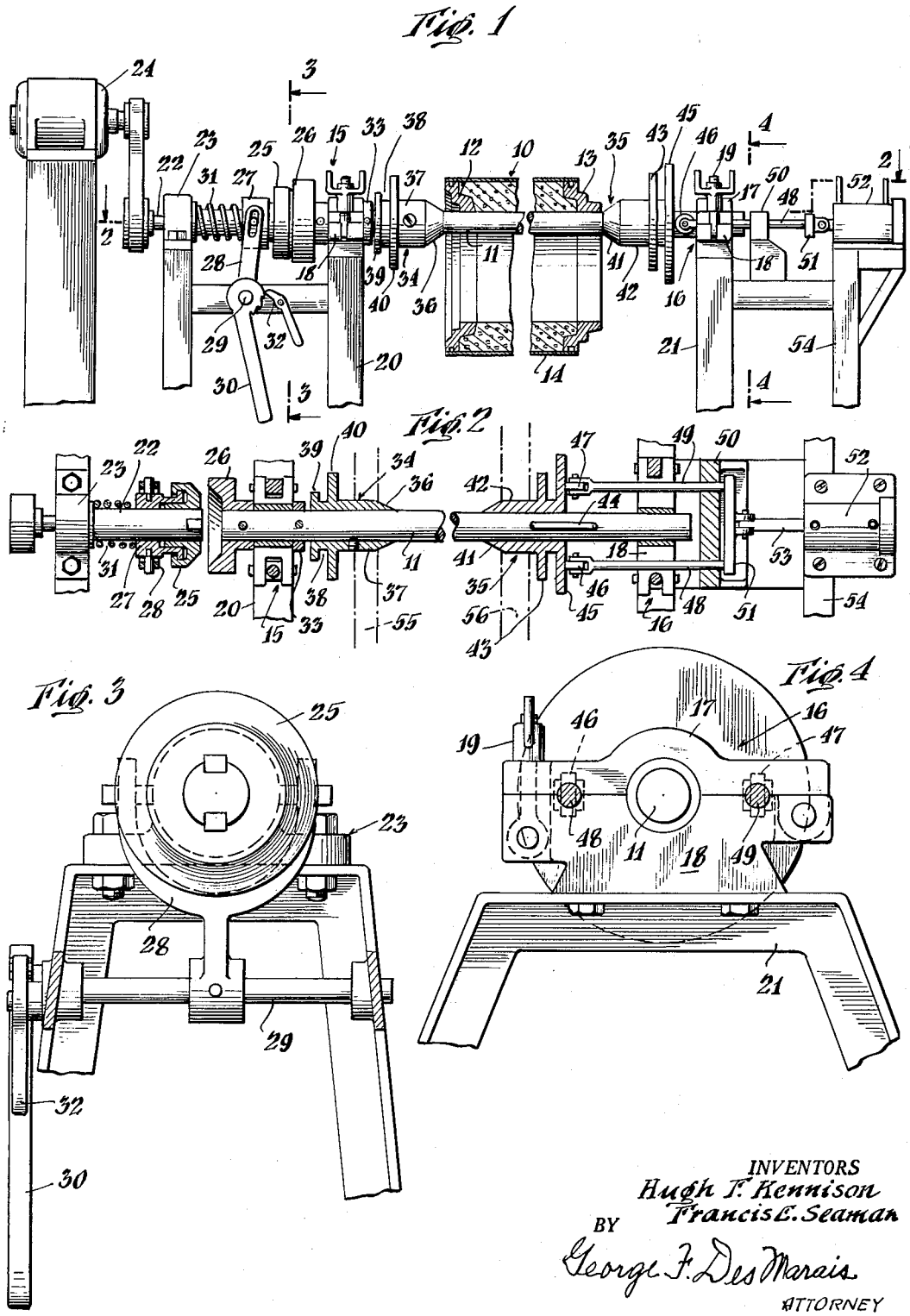

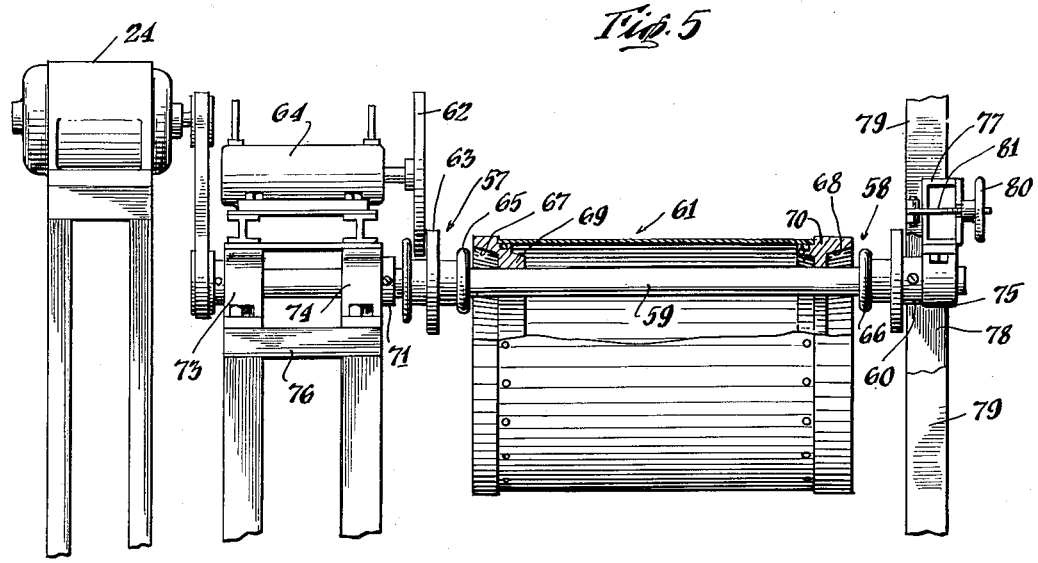
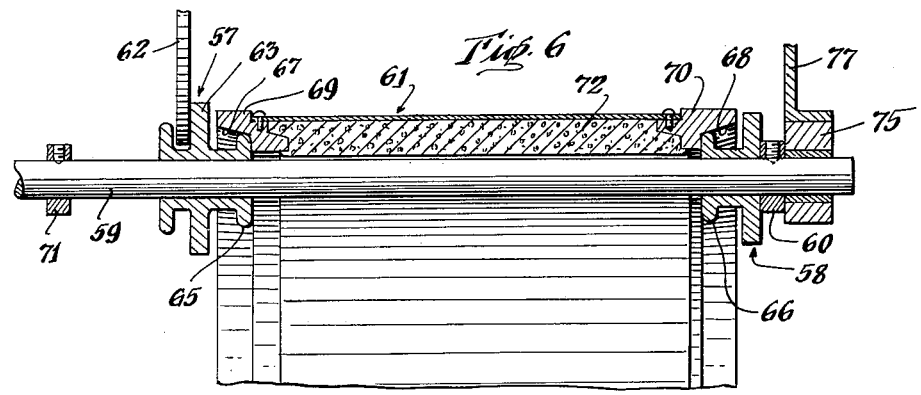
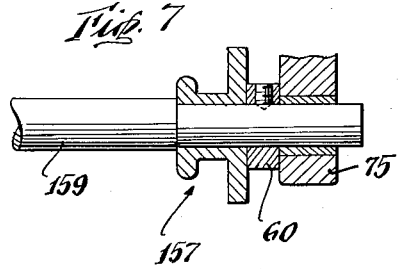 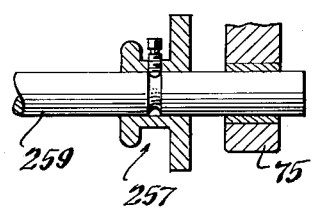
INVENTORS
Hugh F. Kennison
BY Francis E. Seaman
George F. DesMarais
ATTORNEY

2,724,886

APPARATUS FOR FORMING A HOLLOW BODY OF CONCRETE OR THE LIKE

Hugh Foster Kennison, Verona, and Francis Eugene Seaman, Wharton, N. J., assignors to Lock Joint Pipe Company, East Orange, N. J., a corporation of New Jersey Application December 2, 1953, Serial No. 395,752

7 Claims. (Cl. 25—30)

This invention relates to an apparatus for forming a hollow body of concrete or the like. The apparatus with which the present invention is concerned includes an open-ended mould which is suspended on a rotatable shaft or roller extending through circular openings in rings at the ends of the mould. The shaft engages the inner edges of the rings and rotates the mould. A hollow body, such as a pipe, is formed by feeding concrete or other cementitious material to the mould. The material is distributed around the interior of the rotating mould and is compacted by the shaft.

A dense and highly compacted wall is obtainable with a relatively dry concrete mix supplied to the mould in such quantities as to mould a product having an inside diameter slightly less than the diameter of the circular openings in the end rings of the mould. When the mould is filled to this extent and the rotation of the mould is stopped, the shaft will impress a groove in the material because the weight of the mould and its contents is transmitted through the moulding material to the shaft. The displacement of the moulding material by the shaft as the mould settles onto the shaft causes a break or interruption in the continuity of the circular inner surface of the moulded product. It is an object of the present invention to produce in an apparatus of the foregoing type a pipe or other hollow moulded body with a continuous inner circular surface.

According to the present invention, contact between the moulding material and the shaft is broken toward the end of a moulding operation and while the mould is rotating. The moulding material is thereby gradually relieved from its function of transmitting the weight of the mould and its contents to the shaft so that the shaft does no leave a mark in the interior surface of the moulded product. The mould-raising means comprise members carried by the shaft and cooperating members on the mould whereby, when the members on the shaft are moved relatively to the mould and in engagement with the members on the mould, and the mould is moved laterally of the shaft. The mould, in effect, is wedged or cammed upwardly. The members hold the mould with the inner surface of the moulded product spaced from the shaft until the mould is removed.

In one embodiment of the invention the members on the shaft are sleeves having tapered surfaces, one sleeve adjacent each end of the mould with its reduced or smaller end extending toward the mould. By advancing one of these sleeves toward the other, rings on the mould are engaged by the sleeves and the mould is raised along the tapered surfaces. In another embodiment of the invention, the members are sleeves designed to engage with conical surfaces on the end rings of a mould, and the mould is moved outwardly from the shaft when the sleeves and the rings are caused to slide over one another.

A fuller understanding of the invention may be had from the following description and accompanying drawing.

In the drawing,

Fig. 1 is an elevational view of an apparatus employing the principle of the invention with the mould shown in section;

Fig. 2 is a horizontal section on line 2—2 of Fig. 1;

Fig. 3 is an enlarged detail as viewed on line 3—3 of Fig. 1;

Fig. 4 is an enlarged detail as viewed on line 4—4 of Fig. 1;

Fig. 5 is an elevational view of a modified apparatus;

Fig. 6 is an enlarged detail of the shaft of the apparatus illustrated in Fig. 5 with the sleeves supporting the mould in raised position;

Fig. 7 illustrates an optional manner of mounting a sleeve on the roller; and

Fig. 8 illustrates still another arrangement for a sleeve.

As illustrated in Fig. 1, the mould 10 is mounted on the suspension shaft or roller 11. The mould comprises mould end rings 12, 13, spaced apart by a cylindrical shell 14 to which the rings are attached. The rings 12 and 13 are annular members having circular openings through which the shaft 11 extends.

The shaft 11 is supported in bearings 15 and 16 which may be of any conventional type, although it is preferable that one of the bearings be capable of resisting axial thrust. The bearing illustrated in Fig. 4 includes an upper bearing housing 17 which is pivoted at one end to a fixed lower bearing housing 18. The upper and lower housings are closed by a screw and nut device 19 which enables them to be readily parted for removing the shaft. The bearing 15 adjacent the other end of the shaft is similarly constructed. The fixed lower bearing housings are bolted to and supported by frame members 20 and 21, respectively.

The shaft 11 is aligned with a drive shaft 22 which is supported by a thrust bearing 23 and is driven from a motor 24. The drive shaft carries one member 25 of a clutch and the suspension shaft carries the other member 26. The clutch member 25 is keyed to the shaft 22 for axial movement. A collar 27, loosely mounted on the shaft 22, is positionable by a yoke 28 which is attached to a rockshaft 29 to which a handle 30 is also attached. The clutch may be held in disengaged position (Fig. 2) against the action of the spring 31 by a detent 32.

The clutch element 26 is pinned to the suspension shaft 11 and may also serve as a collar for engaging one end of the housing of the bearing 15 to restrict axial movement of the roller in one direction. A collar 33, fastened to the shaft 11, prevents movement of the shaft in the opposite direction.

The shaft 11 carries two members or sleeves 34 and 35 which are disposed opposite the ends of the mould 10. The sleeve 34 is fastened to the shaft to rotate with the shaft but it may be free to turn on the shaft, if desired. The sleeve 34 has a tapered surface 36 with its reduced end extending towards the mould, and a cylindrical surface 37 disposed at the larger end of the tapered surface and adapted to support the mould ring 12 in spaced relationship to the shaft 11. An annular groove 38 between a pair of radial flanges 39 and 40 provides a channel whereby a loop from a sling may be attached for carrying the shaft. The flange 40 is an abutment for limiting relative axial movement between the mould and the sleeve.

The other sleeve 35 is constructed similarly to the sleeve 34 and has a tapered surface 41, a cylindrical surface 42, an abutment flange 43 and an annular groove. The reduced end of the tapered surface extends toward the mould end ring 13. The shaft 11 carries a key 44 engaging a longitudinal groove in the sleeve 35 for turning the sleeve with the shaft while permitting longitudinal movement of the sleeve, but this connection may be omitted and the sleeve left free to turn on the shaft.

The flange 45 on the member 35 has sufficient expanse for engagement by rollers 46 and 47 which are carried by the rods 48 and 49 (Fig. 2) of a device by which the sleeve 35 may be moved toward the mould, as desired. The rods 48 and 49 pass through and are slidable in openings in the housing of the bearing 16.

The rods 48 and 49 are mounted for endwise movement in a bracket 50. Each rod is threaded to a plate 51 and the plate is actuated by a jack or fluid cylinder 52 and a piston 53 which is connected to the plate 51. The cylinder 52 is supported on a stationary part of the frame 54.

The rods 48 and 49 are removably mounted in the plate 51 to enable the replacement of these rods by longer rods suitable for sliding the sleeve 35 along the shaft when the apparatus is set up for making shorter lengths of pipe.

For moulding a pipe or other hollow body, the shaft 11 is passed through a mould 10, and with the mould suspended on the shaft the shaft is picked up by a sling or lifting beam having straps which engage the respective sleeves 34 and 35. The shaft is then mounted in the bearings 15 and 16 and these bearings are closed. The shaft is coupled to its drive and as the mould rotates the mould is supplied with a concrete mix or other cementitious material. When the mould has been filled to a diameter slightly less than the inner diameter of the mould, the speed of its rotation may be gradually reduced, and as this is taking place the power mechanism 52 is operated to cause the sleeve 35 to slide into contact with the mould end ring 13 and to slide the mould, if necessary, toward the sleeve 34. Continued movement of the sleeve 35 causes the end rings 12 and 13 to slide over the tapered surfaces 36 and 41 of the sleeves. Since the purpose is to raise the mould from the roller by lessening the distance between the sleeves, it is apparent that this can be accomplished by moving either or both of the tapered members along the shaft by the use of actuating mechanism similar to that described for advancing the sleeve 35.

As the mould leaves the shaft the shaft finishes the inner surface of the moulded pipe in a continuous circular surface. Further movement of the sleeve 35 brings the edges of the circular openings of the end rings 12 and 13 onto the cylindrical surfaces 37 and 42, respectively, with the end rings assuming the approximate positions indicated by the broken lines 55, 56 in Fig. 2. Upon disengagement of the clutch the shaft and the mould come to rest, and the shaft, together with the mould and its contents, are ready for removal. This is accomplished by using a sling to hoist the shaft from the opened bearings 15 and 16. An empty mould and another shaft may be placed in the apparatus as the filled mould is being disposed of.

In the modified form of the invention illustrated in Fig. 5, the tapered or conical surfaces are on the end rings of the mould instead of on the sleeves. Each of the sleeves 57 and 58 is free to rotate on the suspension shaft or roller 59, but they may be arranged to turn with the shaft, if desired. The sleeve 58 is prevented from moving to the right by a collar 60 which is pinned to the shaft.

The movement of the sleeve 57 along the shaft and into engagement with the mould 61 is obtained by the axial movement of a wheel 62 which engages a circular flange 63 on the sleeve 57. The movement and position of the wheel 62 is controlled by a fluid-operated device 64.

The sleeves 57 and 58 have annular rims 65 and 66, respectively, with radial dimensions of such extent as to be capable of engaging the sloping or tapering surfaces 67 and 68 on the mould rings 69 and 70, respectively, and lift the end rings from contacting engagement with the shaft when the distance between the sleeves 57 and 58 is shortened.

As illustrated in Fig. 6, the sleeve 57 has been shifted to the right from the fixed collar 71. As it was shifted it moved the mould endwise and engaged the end ring 70 with the sleeve 58 and then raised the mould as the rims 65, 66 slid over the sloping surfaces 67 and 68 of the mould rings. The extent of radial movement given the mould is such as to space the finished interior of the moulded product 72 from the shaft. Since the mould is gradually raised as the shaft and mould are rotating, the inner surface of the product is left smooth and continuous around its circumference without any appreciable indication of the line at which breakage occurred between the moulded material and the shaft.

Except when prevented by the mould the sleeve 58 may slide along the shaft 59. The thrust-restraining collar 60 is adjustable lengthwise of the shaft and may be fixed to the shaft in any position required for accommodating another length of mold. As shown in Fig. 7, the end of the shaft 159 is reduced to provide a shoulder for preventing axial displacement of the sleeve 157 toward the mould, although it is free to turn on the shaft. The sleeve 257 of Fig. 8 is located axially of the shaft 259 by a set screw extending into a circumferential groove in the shaft and may turn on the shaft.

While the shaft 59 is shown in this instance to be mounted in bearings 73 and 74 at its driven end and in a bearing 75 removable from its outboard end, it is apparent that the mechanism described is adaptable for association with shafts which are removable from an apparatus, such as shown in Fig. 1, for example. The bearings 73 and 74 are bolted to a stationary part of the main frame 76. The bearing 75 is carried by a gate member 77 which is pivotally supported at one end from a rear post 78. Its other end is clamped to a front post 79 by a handwheel 80 on a nut engaging a swivel screw 81 which is pivoted on the front post 79. The filled mould is removed by first lifting it free from the sleeves 57 and 58 and then carrying it out over the outboard end of the shaft after the gate and outboard bearing have been moved out of the way.

The present invention is capable of numerous forms and various applications without departing from the essential features herein disclosed. It is therefore intended and desired that the specific description herein be deemed illustrative and not restrictive and that the patent shall cover all patentable novelty herein set forth; reference being had to the following claims rather than to the particular showing herein to indicate the scope of this invention.

What is claimed is:

1. Apparatus for forming a hollow body of concrete or the like, comprising a rotatably supported shaft, a hollow rotary mould suspended on said shaft and rotated thereby, said mould having rings spaced apart and providing inner circumferential edges for engaging said shaft, and means for raising said mould laterally of said shaft, said means comprising a member carried by said shaft adjacent each end of said mould and means for moving said members relatively to and in engagement with said mould and said mould laterally of said shaft.

2. The combination set forth in claim 1 wherein the respective members adjacent the ends of said mould are sleeves having tapered surfaces for engaging said mould.

3. The combination set forth in claim 2 wherein each of said sleeves has a cylindrical surface adjacent the larger end of the tapered surface.

4. The combination set forth in claim 1 wherein said rings have annular surfaces inclined with respect to the axis of said mould for engagement by said members to raise said mould laterally of said shaft.

5. Apparatus for forming a hollow body of concrete or the like, comprising a hollow rotary mould having spaced-apart annular members extending radially inwardly of the outer moulding surface of said mould, a rotatably supported shaft for rotating said mould, said shaft extending through said annular members and supporting said mould, a sleeve mounted on said shaft adjacent each of said annular members, each of said sleeves having a tapered surface with its smallest end extending toward and adjacent annular member, and means operable on one of said sleeves to cause said annular members to slide along the tapered surfaces of said sleeves and laterally upward from said shaft.

6. The combination set forth in claim 5 wherein each of said sleeves has a radially disposed flange for limiting the movement of an annular member along the sleeve.

7. Apparatus for forming a hollow body of concrete or the like, comprising a hollow rotary mould having spaced-apart annular members extending radially inwardly of the outer moulding surface of said mould, a rotatably supported shaft for rotating said mould, said shaft extending through said mould and suspending said mould by engagment with said annular members, said mould having a sloping surface adjacent each end of the mould and concentric to the axis of the mould, a sleeve mounted on said shaft adjacent each of said sloping surfaces, and operating means for sliding one of said sleeves along said shaft in engagement with one of said sloping surfaces and said other sloping surface in engagement with the other of said sleeves and cause said mould to rest on said sleeves in a position laterally displaced from said shaft.

References Cited in the file of this patent

FOREIGN PATENTS 658,548    Great Britain ---------- Oct. 10, 1951